United States Patent
Lydon et al.

(10) Patent No.: US 6,648,147 B1
(45) Date of Patent: Nov. 18, 2003

(54) PHASE-SEPARATION MEMBER

(75) Inventors: Richard Patrick Lydon, Handbridge (GB); Fredrick Doran, Haslingden (GB)

(73) Assignee: Madison Filter 981 Limited, Rossendale (GB)

( * ) Notice: Subject to any disclaimer, the term of this patent is extended or adjusted under 35 U.S.C. 154(b) by 0 days.

(21) Appl. No.: 09/674,527

(22) PCT Filed: May 21, 1999

(86) PCT No.: PCT/GB99/01421

§ 371 (c)(1), (2), (4) Date: Feb. 20, 2001

(87) PCT Pub. No.: WO99/61130

PCT Pub. Date: Dec. 2, 1999

(30) Foreign Application Priority Data

May 23, 1998 (GB) .............................................. 9811082

(51) Int. Cl.⁷ ......................... B01D 39/08; B01D 39/16
(52) U.S. Cl. ....................... 210/490; 210/496; 210/499; 210/507; 210/508; 210/510.1; 428/306.6; 428/308.4; 428/315.5; 442/72; 442/76; 442/94; 442/170; 162/900; 162/902; 162/903

(58) Field of Search ................................. 210/490, 496, 210/504, 507, 508, 499, 510.1; 442/71, 72, 76, 77, 94, 98, 170, 171, 221, 226, 315, 374; 55/524; 428/306.6, 307.3, 308.4, 316.6, 315.5; 162/900, 901, 902, 903

(56) References Cited

U.S. PATENT DOCUMENTS 4,874,516 A * 10/1989 Kondo ........................ 210/490
6,036,735 A * 3/2000 Carter et al. ................ 55/341.1

FOREIGN PATENT DOCUMENTS

| EP | 0 653 235 | 5/1995 |
|---|---|---|
| GB | 2 288 755 | 11/1995 |
| GB | 2 316 015 | 2/1998 |
| WO | 98/07925 | 2/1998 |

* cited by examiner

Primary Examiner—Matthew O. Savage
(74) Attorney, Agent, or Firm—Jacobson Holman PLLC

(57) ABSTRACT

A phase-separation member comprises a porous substrate (11) containing void spaces, a microporous polymer material (14) which at least partially impregnates the porous substrate by entering into the void spaces, and a layer of a fluoropolymer applied to the outer face of the coagulated polymer material so that the layer (16) of fluoropolymer material remains predominantly at the surface.

22 Claims, 1 Drawing Sheet

PHASE-SEPARATION MEMBER

BACKGROUND OF THE INVENTION

1. Field of the Invention

The invention relates to improvements in phase-separation members, in particular solid-liquid industrial separation, filter media such as filter cloths or filter belts, for all recognised pressure and vacuum filtrations systems, such as rotary drum filters, belt filter presses, etc. The term phase-separation members also includes papermaking fabrics such as forming fabrics, press felts, dryer fabrics or transfer fabrics. The invention also relates to corrugator belts and conveyor belts. These members are preferably water permeable.

2. Prior Art

It is known for such members particularly but not exclusively in the case of filters and papermaking fabrics, to provide a substrate, for example of a woven fabric, a spiral link fabric, a sintered sheet, a needlefelt or nonwoven textile, or a porous film. Such members are often made from or include fibres or particles of a low surface energy material such as a polyolefin, typically polypropylene.

To improve properties of the filter or papermaking fabric, such as filter cake release, it is desirable to be able to coat the substrate with a fluoropolymer such as PTFE. However, low surface energy materials such as polyolefins bond very poorly to fluoropolymers, and as a result durable release coatings are difficult to achieve on substrates of the kind mentioned.

We have previously proposed a process for filtering kaolin particles, in GB-A-2316015, using a filter comprising a fabric substrate coated or impregnated with a coagulated polymer. We have also proposed, in GB-A-2, 288, 755 a coated filter fabric comprising a cloth impregnated with a coagulated polymer latex which is coagulated in situ after impregnation in steam. These disclosures do not consider any problem other than provision of a microporous polymer medium within the voids of a fabric substrate, and do not suggest any solution to the problem of bonding a fluoropolymer coating to a low surface energy material substrate. Also in WO98/07925 we disclose a filter etc fabric which may be rendered porous by preinclusion of hollow yarns or fibres which may be opened by abrasion, to provide passages in the fabric. It is suggested that the fabric may be encapsulated in a polymer although it is not suggested that a coagulatable or microporous material be used, and separately that fluoropolymer may be used to improve non-stick and contaminant resistant properties. It is not suggested that there is any problem involved with the use of fluoropolymer coatings, or that the use of a microporous layer might mitigate this.

An object of the invention is to provide an improved phase-separation member or the like in which a durable bond is achievable between a low-surface energy substrate material, and a fluoropolymer.

SUMMARY OF THE INVENTION

According to the invention a phase-separation member or the like comprises a porous substrate of a low surface energy material having void spaces therein, and a fluoropolymer layer applied to at least one outer surface of the member, characterised in that a microporous polymer material is provided which at least partially impregnates said porous substrate, and in that the fluoropolymer layer is applied to an outer surface of said microporous polymer material such that the fluoropolymer layer remains predominantly at such outer surface, the microporous polymer serving to provide a bond between the fluoropolymer layer and the low surface energy material of the porous substrate.

The microporous polymer may be a coagulated polymer which is coagulated during or after impregnation of the substrate thereby.

The microporous layer can be of any synthetic or natural polymer which can be dissolved in a solvent, for example a polyurethane, silicone, fluoroelastomer or rubber.

The porous substrate may comprise or include particles, yarns or fibres of a low surface energy material such as a polyolefin, especially polypropylene. The porous substrate may be in the form of any of the substrates listed hereinbefore, i.e. woven or nonwoven fabric, knitted structures, needlefelt fabric, porous film, sintered sheet of metal or synthetic particles or fibres, or spiral link fabric.

All the above substrate structures include void space into which the coagulated polymer can at least partially penetrate. Preferably the substrate structure is impregnated to a substantial extent, e.g. to half or more than half the thickness of the substrate and provides a coating not only over the substrate but within the void space, of the yarns, fires, or particles forming the substrate to provide a filter medium of much finer pore size than would be provided by the substrate unaided. Advantageously, the coagulated polymer impregnates the substrate, i.e. provide a coating on both major surfaces as a well as impregnating the substrate.

The fluoropolymer used in coagulation or to coat the substrate after impregnation of the latter with the coagulated polymer may comprise a synthetic fluorinated elastomer such as polymers or copolymers of vinylidene fluoride; pentafluoropropene; tetrafluoroethylene; hexafluoropropene; e.g. vinylidene fluoride-pentafluoropropene-tetrafluoroethylene terpolymer, or vinylidene fluoride-hexafluoropropene-tetrafluoroethylene terpolymer. Fluoropolymers such as tetrafluoroethylene PTFE or other fluoro-alkene polymers however may be used.

The coagulatable polymer may be a relatively low viscosity material, in the range 300–1000 cP, e.g. of about 500 cP, and have a relatively high solids content. The low viscosity enables the polymer to penetrate substantially into the substrate structure, entering into the voids or interstices between fibres, yarns or particles making up the substrate.

The coating and impregnating layer of coagulatable polymer may be applied to the substrate as the polymer is coagulating, for example using DMF in a 5–30% solids solution. The coagulated polymer is typically a low surface energy polymer.

Coagulation may be achieved by heating the impregnated coated textile substrate in the presence of a heat coagulant. Suitable heat coagulants include vinyl alkyl ethers and derivatives thereof; polyacetals; polythio ethers; poly (ethylene oxide) and derivatives thereof; and poly (propylene/ethylene oxide) and derivatives thereof. Heating to a temperature of about 70° C. is sufficient to effect coagulation.

An alternative method of coagulation is by adding a suitable electrolyte and/or varying the pH of the polymer latex. For example, with cationic polymers, coagulation may occur at an alkaline pH and for anionic polymers coagulation occurs at an acidic pH.

The coagulatable or coagulating polymer may be applied by any coating technique such as knife coating, dip-coating, screen printing or spraying, padding or using reverse roller techniques.

The fluoropolymer coating is in turn preferably applied to the outer surface of the coagulated polymer coated substrate by lick coating, spraying, foaming or paste spreading as a particulate dispersion, with for example 40–70 wt % solids and particle size 0.1–0.5 microns, onto the receiving surface and then the liquid component of the dispersion (which is preferably water for environmental reasons) is removed e.g. by evaporation pressing in a mangle, or suction into a slot, to leave a well-bonded low surface energy coating. Consolidation of the fluoropolymer coating can be improved by calendering the coated fabric to consolidate the structure, thereby improving retentivity (i.e. capture of filtrate particles) and smoothness (for better cake release).

The smooth fluoropolymer coating provides the microporous structure and any yarn knuckles or floats proud of said structure with enhanced abrasion resistance, as well as providing the fabric with good cake release properties. Filtrate particles are captured in the coagulated polymer forming the microporous structure.

Bodies such as hollow glass microbeads may be used to fill voids in the substrate, in place of or in addition to the coagulated polymer.

The coagulated polymer may be applied at a weight of 20–200 g/m$^2$, producing a coating substrate (made from e.g. a polymolefin, polyester, polyamide, or PANO, with a weight of 50–2000 g/m$^2$, before calendering.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A number of possible embodiments of phase-separation or the like members according to the invention will now be described, by way of example, with reference to the accompanying drawings, wherein.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the from this detailed description.

Figure 1:
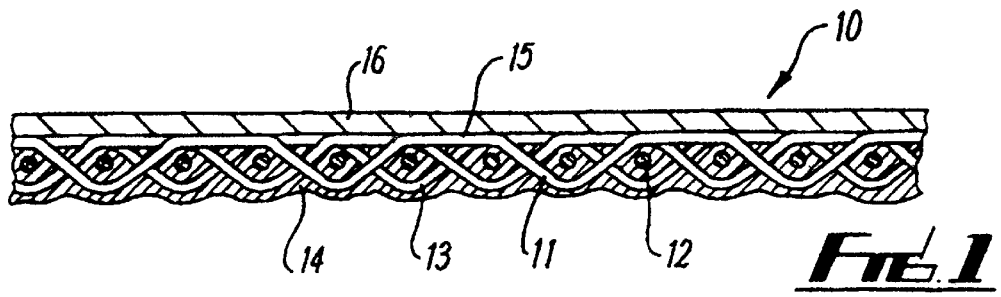
FIG. 1 is an enlarged fragmentary cross section of a filter belt in accordance with the invention, incorporating a woven textile fabric substrate.

In FIG. 1, a belt 10 is shown which may be suitable for use as a filter belt. This comprises a woven substrate 11, shown diagrammatically as comprising CD yarns 12 and MD yarns 13 interwoven therewith, in a typical float and knuckle pattern. The substrate 11 is impregnated with a coagulated polymer material 14, as shown by cross-hatching.

The upper side floats 15 of the MD yarns 13 are however exposed above the material 14, which thereby presents a wear resistant surface proud of the coagulated polymer layer 14. The layer 14 extends below the fabric 11, and partially encapsulates the fabric on this lower side.

The floats 15, and the layer 14 of coagulated polymer material is coated with a layer 16 of a fluoropolymer material. This promotes release of any material such as filter cake collecting on the surface of the layer 16.

Figure 2:
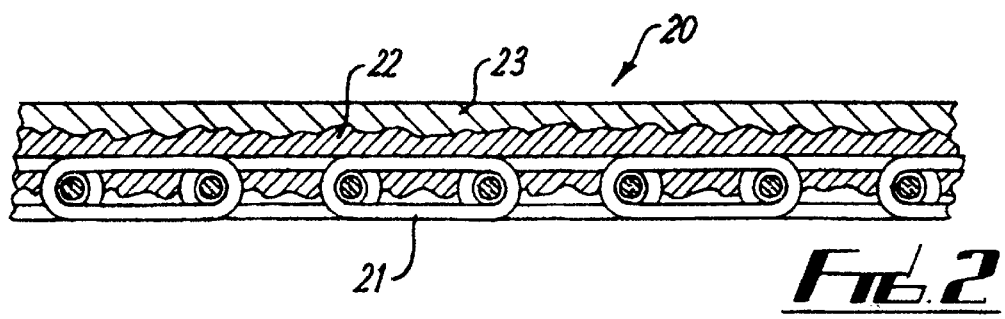
FIG. 2 is a similar view to FIG. 1 of a papermachine fabric incorporating a spiral link fabric substrate.

FIG. 2 shows a papermachine belt 20 having a spiral link fabric substrate 21, which is partially impregnated with a layer 22 of a coagulated polymer material, which is in turn coated on an upper surface with a layer 23 of a fluoropolymer material. The layer 22 may be reinforced with a woven or nonwoven layer, or a fibrous batt as commonly used in the structure of composite papermachine belts.

Figure 3:
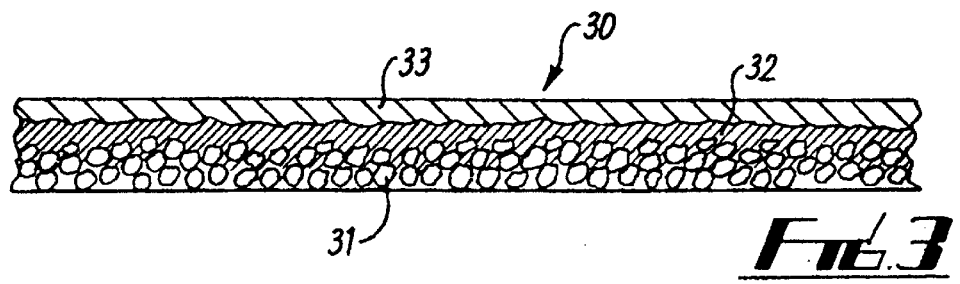
FIG. 3 is a similar view of a filter fabric incorporating a substrate formed of a sheet of sintered particles.

FIG. 3 shows a filter fabric 30, comprising a substrate 31 comprised of sintered particles or beads of solid or porous polymer material, that is partially melted under pressure so that contacting surfaces of the particles or beads are bonded on resetting of the polymer, leaving voids and interstices between the particles. Other sintered materials, such as metals, or thermoplastic fibres may be used for substrate 31.

Substrate 31 is coated and partially impregnated with a layer 32 of a coagulated polymer material, which penetrates into the voids and interstices of substrate 31 to at least half way through the thickness of the substrate, as shown by cross-hatching in the drawing. In turn, layer 32 is coated with a coating layer 33 of a fluoropolymer material.

Figure 4:
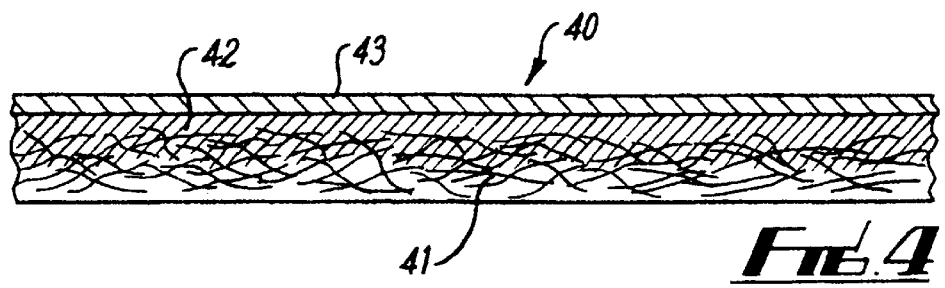
FIG. 4 is a similar view of a papermachine press felt, having a substrate of a nonwoven textile fabric.

In FIG. 4, a papermachine press felt 40 comprises a substrate 41 formed of a fibrous nonwoven batt or layer. A coagulated polymer layer 42 is provided on the substrate 41, and penetrates into the interstices of the fabric, between fibres to impregnate the substrate 41 to a substantial extent, as suggested by cross-hatching. The layer 42 may completely impregnate the substrate 41.

A fluoropolymer coating 43 is applied to the layer 42.

Figure 5:
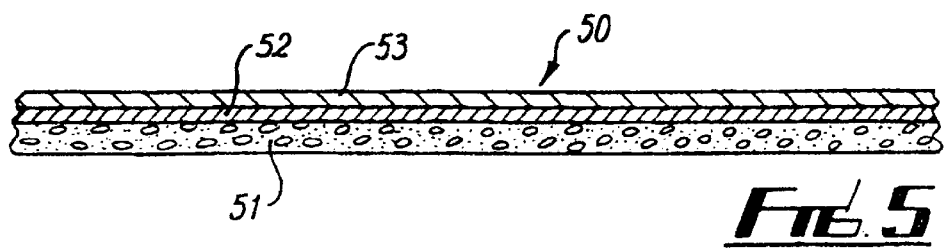
FIG. 5 is a similar view of a member incorporating a porous film substrate, which may be used in any of the above uses, or for example as a conveyor belt.

FIG. 5 shows a further embodiment of material 50 according to the invention which may be used as suggested in any of the above described embodiments, or for example in conveyor belting. This material 50 comprises a substrate 51 of a porous (e.g. foamed) membrane of plastics material, which is rendered water permeable by its porous nature. The substrate 51 is coated with a layer 52 of coagulated polymer material, which penetrates into the porous structure of the substrate 51, although this cannot be conveniently illustrated in the drawing. Layer 52 is coated in its turn with a layer 53 of a fluoropolymer.

In the foregoing embodiments, the coagulated polymers, the fluoropolymer coatings, and the materials of the substrates are selected from the examples set out earlier in the above description.

What is claimed is:

1. A durably bonded phase-separation member comprising a porous substrate of a low surface energy material having void spaces therein, a microporous polymer material at least partially impregnating said porous substrate, and a fluoropolymer layer applied to an outer surface of said microporous polymer material so as to remain predominantly at said outer surface, said microporous polymer material serving to provide a durable bond between said fluoropolymer layer and said low surface energy material of said porous substrate.

2. The phase-separation member according to claim 1, wherein said microporous polymer material is of a natural polymer which can be dissolved in a solvent.

3. The phase-separation member according to claim 1, wherein said microporous polymer material is any one of a polyurethane, a silicone, a fluoroelastomer, or a rubber.

4. The phase-separation member according to claim 1, wherein said low surface energy material is a polyolefin.

5. The phase-separation member according to claim 1, wherein said porous substrate comprises any one of a woven or nonwoven fabric, a knitted or a needle felt fibre, a porous film, a sintered sheet of synthetic particles, or a spiral link fabric.

6. The phase-separation member according to claim 1, wherein said porous substrate is impregnated to at least half of a thickness of said substrate and said polymer material provides a coating over said porous substrate, and within said void spaces, to provide a filter medium of finer pore size than said porous substrate.

7. The phase-separation member according to claim 6, wherein said microporous polymer coagulates and impregnates said porous substrate substantially completely.

8. The phase separation member according to claim 1, wherein said fluoropolymer layer includes a synthetic fluorinated elastomer.

9. The phase separation member according to claim 8, wherein said fluoropolymer layer is any one of: a polymer or copolymer of vinylidene fluoride; pentafluoropropene; tetrafluoroethylene; or hexafluoropropene.

10. The phase separation member according to claim 9, wherein said polymer or copolymer of vinylidene fluoride is any one of: vinylidenefluoride-pentafluoropropene-tetrafluoroethylene terpolymer; or vinylidene fluoride-hexafluoropropene-tetrafluoroethylene terpolymer.

11. The phase separation member according to claim 1, wherein said microporous polymer material is coagulatable and has a viscosity in a range of 300–1000 cP.

12. The phase separation member according to claim 1, wherein hollow glass microbeads are used to fill the void spaces on said substrate.

13. The phase-separation member according to claim 1, wherein said microporous polymer material is of a synthetic polymer which can be dissolved in a solvent.

14. A durably bonded phase-separation member comprising a porous substrate of a low surface energy material having void spaces therein, impregnated to at least half of a thickness of said substrate with a microporous polymer material and coated on an outer surface of said microporous polymer material with a fluoropolymer layer applied so as to remain predominantly at said outer surface, said microporous polymer material forming a durable bond between said fluoropolymer layer and said low surface energy material, and said phase-separation member having a finer pore size than said porous substrate alone.

15. The phase separation member according to claim 14, wherein said microporous polymer material is coagulatable and has a viscosity in a range 300–1000 cP.

16. The phase separation member according to claim 14, further comprising hollow glass microbeads used to fill the void spaces on said substrate.

17. The phase-separation member according to claim 14, wherein said porous substrate comprises any one of a woven or nonwoven fabric, a knitted or a needle felt fibre, a porous film, a sintered sheet of synthetic particles, or a spiral link fabric.

18. The phase-separation member according to claim 14, wherein said microporous polymer material coagulates and impregnates said porous substrate substantially completely.

19. The phase separation member according to claim 14, wherein said fluoropolymer layer includes a synthetic fluorinated elastomer.

20. The phase-separation member according to claim 14, wherein said microporous polymer material is of a natural polymer which can be dissolved in a solvent.

21. The phase-separation member according to claim 14, wherein said microporous polymer material is any one of a polyurethane, a silicone, a fluoroelastomer, or a rubber.

22. The phase-separation member according to claim 14, wherein said low surface energy material is a polyolefin.

* * * * *